United States Patent
Lueck et al.

(10) Patent No.: US 7,059,194 B1
(45) Date of Patent: Jun. 13, 2006

(54) PRESSURE FAULT DEVICE

(75) Inventors: Michael A. Lueck, Bloomfield Hills, MI (US); Michael P. Johnson, White Lake, MI (US); Randall R. Perkins, Clinton Township, MI (US)

(73) Assignee: Mid-West Instruments, Sterling Heights, MI (US)

( * ) Notice: Subject to any disclaimer, the term of this patent is extended or adjusted under 35 U.S.C. 154(b) by 0 days.

(21) Appl. No.: 09/526,651

(22) Filed: Mar. 15, 2000

(51) Int. Cl.
*G01L 9/10* (2006.01)
*G01L 7/16* (2006.01)
*E03B 7/07* (2006.01)

(52) U.S. Cl. .............................. 73/722; 73/728; 73/744; 137/554

(58) Field of Classification Search .............. 73/722 JR, 73/728, 716, 717, 723, 19.05, 744–746; 210/90, 210/91, 222, 854; D23/235; 137/557, 554; 116/264, 265, 266, 267, 268, 272, 281, 283
See application file for complete search history.

(56) References Cited

U.S. PATENT DOCUMENTS

| 3,568,625 A | * | 3/1971 | Cilento ........................ 116/70 |
| 4,347,744 A | | 9/1982 | Buchanan |
| 4,654,140 A | * | 3/1987 | Chen .......................... 210/90 |
| 4,729,339 A | | 3/1988 | Whiting |
| 4,792,113 A | * | 12/1988 | Eidsmore ..................... 251/65 |

FOREIGN PATENT DOCUMENTS

| EP | 0 273 358 | 12/1987 |
| JP | 04148055 A | 5/1992 |

\* cited by examiner

*Primary Examiner*—Benjamin Fuller
*Assistant Examiner*—Abdullahi Aw-musse
(74) *Attorney, Agent, or Firm*—Brooks & Kushman P.C.

(57) ABSTRACT

The invention involves a pressure fault device for indicating a threshold pressure or a threshold differential pressure. The present invention provides a cost effective way to determine where a pressure problem has occurred. The device includes a housing having at least one inlet aperture and an indicator aperture and having first and second bores in fluid communication respectively with one inlet aperture and the indicator aperture. The device further includes a magnetic piston which is biased in the first bore toward one inlet aperture and moveable a predetermined distance in another direction in the first bore in response to inlet threshold pressure. The device further includes a magnetic responder which is moveable toward the indicator aperture in the second bore in response to movement of the magnetic piston. The device further includes a latching plate in magnetic relationship to the magnetic responder when the piston moves the predetermined distance. An indicator is disposed in the second bore and partially extends through the indicator aperture. At a threshold pressure or differential pressure, the magnetic responder responds to movement of the magnetic piston and latches onto the latching plate, thrusting the indicator partially through the indicator aperture to indicate a threshold has been reached. The configuration of the magnetic piston and the magnetic responder prevents the magnetic responder from being dislodged from the latching plate, even when the threshold is removed and the magnetic piston returns to its initial position. The magnetic responder can be manually reset when the threshold pressure is removed.

18 Claims, 4 Drawing Sheets

PRESSURE FAULT DEVICE

TECHNICAL FIELD

The present invention relates to a pressure fault device for indicating a threshold pressure.

BACKGROUND ART

Today, pressurized flow systems are common throughout most industries. Most of such systems have mechanisms which regulate flows at specified parameters. Many systems have threshold high and low pressures or differential pressures which define ranges between which the flow should be maintained for safety and optimal purposes.

At times, such systems experience too high or too low pressures or differential pressures which may be caused by a number of events. For example, the system may be partially obstructed by particle buildup within a flow line thereof, a mechanism malfunction may have partially shut a valve causing high pressure buildup, a filter may need changing, etc. In such situations, trouble shooting procedures are typically performed in order to determine the cause of the pressure buildup or loss.

In many systems, a problem regarding excessively high or low pressure or differential pressures may not be discovered for a substantial amount of time after it has occurred. Especially in systems having flows that are not continuous, a system's operator may not identify a flow problem until flow is passed through the system substantially thereafter. In many cases, systems have flows for a substantially short period. For example, some compressors are designed to maintain pressure in building systems between a particular range, e.g., 90–120 psig. When pressure drops below 90 psig, the compressor is typically automatically activated to pressurize the building systems back up to operating pressure. The cumulative time this takes may only be 1 or 2 hours per day. Thus, pressure or flow problems more than likely may only be discovered during those times. In many situations where such flow problems occur, the problem requires minor repair or maintenance, such as simply changing a filter.

However, in many systems, troubleshooting takes a substantial amount of time. For example, troubleshooting procedures may take from several hours to several days to determine the cause of a pressure or flow problem, whether minor or major. Troubleshooting typically involves inspecting each and every flow mechanism, e.g., valves, pipes, gauges, regulators, etc., which may have caused the particular flow problem. Troubleshooting procedures may begin upstream and work downstream. If there was a simple way to determine in advance or during the troubleshooting procedures where the flow problem has occurred, much time and money could be saved.

Thus, what is needed is a simple way to determine in advance or during troubleshooting procedures where a flow problem has occurred.

What is also needed is a simple way to save time in determining where a flow problem has occurred.

DISCLOSURE OF INVENTION

Accordingly, it is an object of the present invention to provide an improved simple device for determining in advance or during troubleshooting procedures where a flow, pressure or differential pressure problem has occurred.

It is another object of the present invention to provide an improved device that saves time in determining where a flow problem has occurred.

A more specific object of the present invention is to provide a pressure fault device for indicating an inlet threshold pressure. The device comprises a housing having at least one inlet aperture and an indicator aperture and defining first and second parallel bores in fluid communication respectively with the at least one inlet aperture and the indicator aperture. The device further includes a magnetic piston which is disposed in the first bore. The magnetic piston is biasingly moveable in one direction toward the at least one inlet aperture and moveable in the opposite direction away from the at least one inlet aperture in response to inlet threshold pressure a predetermined distance. The device further includes a magnetic responder which is disposed in the second bore. The magnetic responder is moveable toward the indicator aperture in response to movement of the magnetic piston. The device further includes a latching plate in magnetically latching relationship to the magnetic responder when the magnetic piston moves the predetermined distance in response to inlet threshold pressure.

Another specific object of this invention is to provide a pressure fault device for indicating an inlet threshold pressure comprising a housing having an inlet aperture and an indicator aperture formed therethrough. The housing further has a first bore in fluid communication with the inlet aperture and extends from the inlet aperture to a shoulder. The housing further has a second bore in fluid communication with the indicator aperture and extends from the indicator aperture to a second end. The second bore is formed adjacent to the first bore and is substantially parallel thereto. The device further comprises a magnetic piston which is disposed in the first bore and is biasingly movable in one direction toward the inlet aperture and movable in the opposite direction away from the inlet aperture, in response to inlet threshold pressure a predetermined distance. The device further comprises a magnetic responder which is disposed in the second bore and is movable toward the indicator aperture in response to movement of the magnetic piston and an indicator partially disposed through the indicator aperture of the housing and extending inwardly through the second bore. The device further includes a latching plate which is disposed on the housing and has a hole formed therethrough aligned with the indicator aperture. The magnetic follower is in magnetically latching relationship with the latching plate when the piston moves the predetermined distance along the first bore in response to inlet threshold pressure, thrusting the indicator outwardly partially through indicator aperture.

It is yet another specific object of the present invention to provide a pressure fault device for indicating a threshold pressure differential. The device comprises a housing which includes a high pressure port, a low pressure port, and an indicator aperture formed therethrough. The housing also defines first and second parallel bores. The first bore has high and low portions respectively in fluid communication with the high and low pressure ports. The second bore is in fluid communication with the indicator aperture and extends to a second bore end. The indicator aperture is adjacent to the high portion of the first bore. The device further comprises a magnetic piston which is disposed in the first bore and between the ports. The magnetic piston has first and second piston ends which are respectively spacing the high and low pressure ports. The first and second piston ends have opposite magnetic polarities. The magnetic piston is biased towards the high pressure port in response to substantially zero pressure differential between the ports. Also, the magnetic piston is oppositely movable a predetermined distance toward the low pressure port in response to pressure differential between the ports. The device further includes a magnetic responder disposed in the second bore adjacent the second end. The magnetic responder has first and second responder ends which are respectively facing the indicator aperture and the second bore end. The first responder end has opposite magnetic polarity to the first piston end. Also, the second responder end has opposite magnetic polarity to the second piston end. The magnetic responder is movable toward the indicator aperture in response to movement of the magnetic piston. Furthermore, the device includes a latching plate which is in magnetically latching relationship to the magnetic responder when the magnetic piston moves in response to pressure differential between the ports the predetermined distance.

BEST MODE FOR CARRYING OUT THE INVENTION

The present invention provides a cost effective, simplistic device for indicating a threshold pressure or differential pressure. The device includes a configuration of magnets. A first magnet moves in accordance with change in pressure and a second magnet moves in response to the first magnet. In its most basic form, the second magnet may move by attracting to or repelling from the first magnet in order to magnetically latch onto a latching plate through which an elongated indicator is disposed. As the second magnet latches onto the latching plate, the indicator is partially thrusted outwardly through the latching plate, indicating a threshold pressure or differential pressure. Due to the configuration of the magnets, the magnetic coupling between the second magnet and the latching plate is stronger than the magnetic coupling between the first magnet and the second magnet. Once latched to the latching plate, the second magnet no longer responds to the first magnet. The second magnet and the indicator can be manually reset when the threshold pressure or differential pressure is removed.

Figure 1:
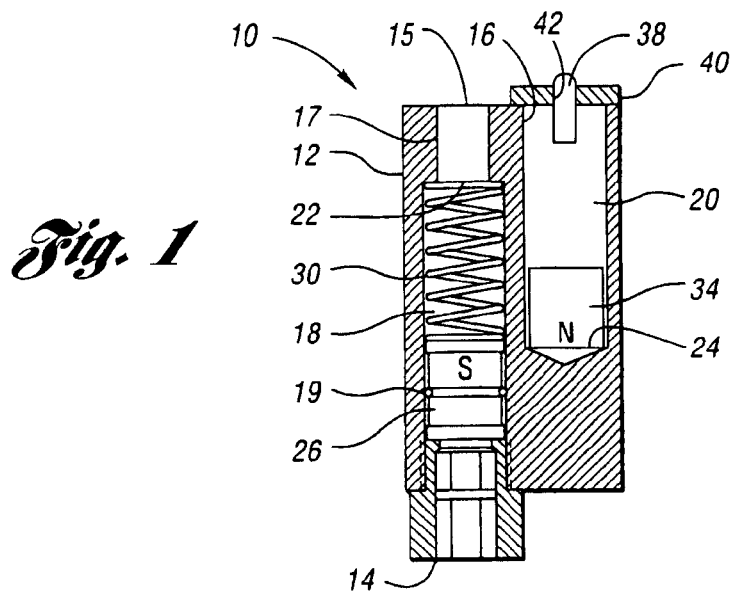
FIG. 1 is a side sectional view of a first embodiment of a device for indicating an inlet threshold pressure in accordance with the present invention.
Figure 2:
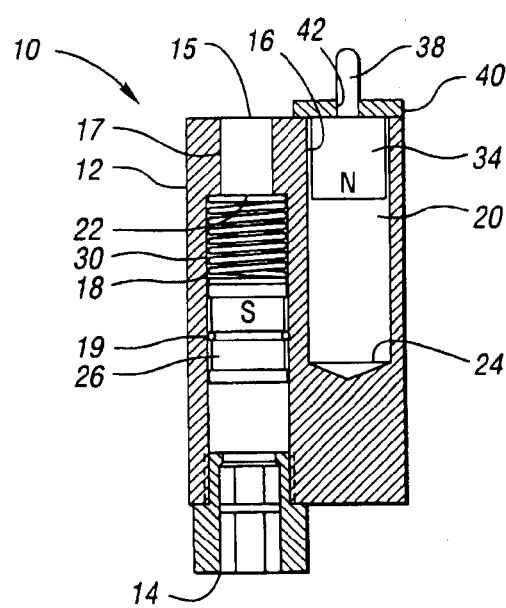
FIG. 2 is a side sectional view of the first embodiment of the device at high pressure.

FIG. 1 illustrates a first embodiment of a pressure fault device 10 at atmospheric pressure for indicating an inlet threshold pressure. As shown, device 10 includes a housing 12 which generally includes an inlet aperture 14, an atmospheric aperture 15, and an indicator aperture 16. Apertures 14 and 15 are in fluid communication with first bore 18. First bore 18 extends from inlet aperture 14 to shoulder 22 having inner walls 17 extending to atmospheric aperture 15. Second bore 20 extends from indicator aperture 16 to second end 24. In this embodiment, second bore is preferably formed adjacent and substantially parallel to first bore 18. Also, first bore 18 preferably has cylindrical walls defining a diameter of first bore 18. Likewise, second bore 20 preferably has cylindrical walls defining a diameter of the second bore. It is to be noted that the housing is made of material that is not capable of being magnetized, such as plastic, aluminum, non-magnetic stainless steel, ceramic, brass or any other non-magnetic material.

First magnet or magnetic piston 26 is disposed within first bore 18. Magnetic piston 26 has an outside diameter which is less than the diameter of first bore 18. Thus, magnetic piston 26 is sized to move freely along first bore 18 such that minimal friction exists between piston 26 and bore 18. This allows movement of magnetic piston 26 along first bore 18 in accordance with change in inlet pressure. Preferably, magnetic piston 26 has seal 19 disposed about piston 26 to lessen leakage from inlet aperture 14 to atmosphere aperture 15. Spring 30 is connected to magnetic piston 26 and shoulder 22 to bias piston 26 toward inlet aperture 14. Spring 30 determines the amount of pressure required to deflect piston 26.

As shown in FIG. 1, second magnet or magnetic responder 34 is disposed within second bore 20. Magnetic responder 34 has an outside diameter which is less than the diameter of second bore 20. Thus, magnetic responder 34 is sized to move freely along second bore 20 such that minimal friction exists between responder 34 and bore 20. This allows movement of magnetic responder 34 along second bore 20 in accordance with movements of magnetic piston 26 along first bore 18. In effect, as magnetic piston 26 moves along first bore 18, magnetic responder 34 magnetically follows piston 26 along second bore 20 which is formed substantially parallel and adjacent to first bore 18.

As shown, indicator 38 is disposed in the second bore 20 of housing 12 and partially through indicator aperture 16. Preferably, indicator 38 is loosely suspended through indicator aperture 16 by any suitable means, allowing indicator 38 to be loosely thrusted outward or inward through indicator aperture 16. Latching plate 40 is disposed about indicator aperture 16 on housing 12 and having hole 42 through which indicator 38 may be suspended therethrough. Latching plate 40 may be metallic or magnetic such that it is in magnetically latching relationship to magnetic responder 34 when responder 34 moves toward indicator aperture 16 as magnetic piston 26 moves along first bore 18 in response to pressure. The magnetic responder 34 may not be dislodged from latching plate 40 even when magnetic piston 26 returns to its initial position of FIG. 1. Magnetic responder 34 may be manually dislodged from latching plate 40 and reset by an operator once the pressure or differential pressure is no longer at the threshold. For example, the operator may push down on indicator 38, thrusting responder 34 downward and dislodging it from plate 40.

Preferably, magnetic piston 26 and magnetic responder 34 are disposed respectively in bores 18 and 20 and have opposing magnetic polarities. In this embodiment, the magnetic polarity of magnetic piston 26 toward one direction along first bore 18 is same as the polarity of magnetic responder 34 in the same direction along second bore 20. In effect, as pressure enters through inlet aperture 14, magnetic piston 26 is pushed towards shoulder 22 against spring 30. As such, magnetic responder 34, having an opposite magnetic pole facing piston 26 magnetically follows magnetic piston 26 along second bore 20.

At a point along second bore 20, magnetic responder 34 latches onto latching plate 40, thrusting indicator 38 outwardly from second bore 20 and partially through indicator aperture 16. Once responder 34 latches thereto, the resulting magnetic affinity between latching plate 40 and magnetic responder 34 is greater than the magnetic affinity between magnetic piston 26 and magnetic responder 34. This may be accomplished by numerous ways. For example, first bore 18 may be formed within housing 12 a predetermined distance from second bore 20 to prevent magnetic dislodging of responder 34 from plate 40 by piston 26. That is, the thickness of the wall separating piston 26 and responder 34 may be varied. The difference in affinity allows for magnetic responder 34 to latch onto latching plate 40 at a point along second bore 20, and experience no dislodging therefrom.

The event of magnetic responder 34 latching onto latching plate 40, thrusting indicator 38 through indicator aperture 16, indicates a predetermined threshold pressure has been reached. A threshold pressure may be set by adjusting or changing spring 30 accordingly. A greater biasing resistance increases the threshold pressure to be reached in order to latch magnetic responder 34 onto latching plate 40. Different springs or other biasing mechanisms do not fall beyond the scope and spirit of this invention. Moreover, different pressure sensors, such as diaphragms or bellows, do not fall beyond the scope and spirit of this invention.

It is to be noted that, in carrying out the present invention, responder 34 may be comprised of a material capable of being magnetized, such as steel. In this embodiment, latching plate 40 is comprised of a magnetic substance, such as ferrite, to facilitate a magnetic relationship between responder 34 and latching plate 40 in order to allow responder 34 to latch to plate 40.

Figure 3:
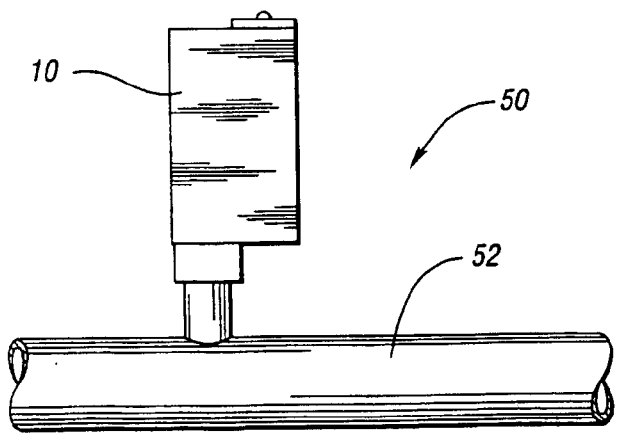
FIG. 3 is a schematic view of a system implementing the first embodiment shown in FIGS. 1 and 2.

In use, device 10, for example, may be applied to indicate that a threshold pressure in a line has been reached. FIG. 3 illustrates system 50 in which device 10 may be applied. Device 10 may be used as a simple way of determining whether a threshold pressure has been reached in pressurized line 52. However, device 10 may indicate a low threshold pressure has been reached. Adjustments and locations (not shown) of spring 30 may be changed in order for device 10 to indicate a low threshold pressure.

Figure 4:
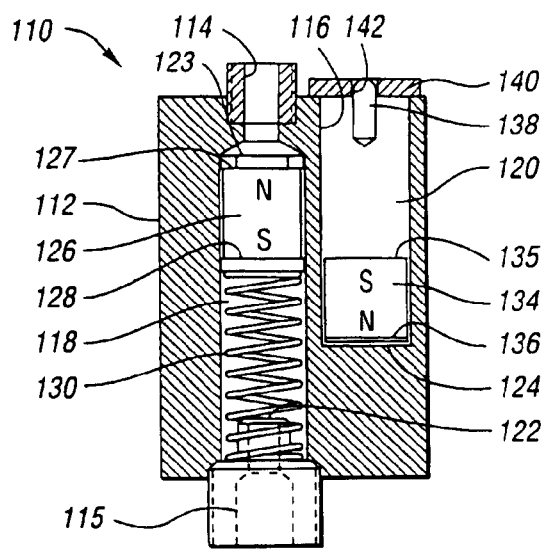
FIG. 4 is a side sectional view of a second embodiment of a device for indicating a threshold differential pressure in accordance with the present invention.

FIG. 4 illustrates a second embodiment of a pressure fault device 110 for indicating a threshold differential pressure. As shown, device 110 includes a housing 112 which generally includes high pressure port 114, low pressure port 115, and indicator aperture 116. High pressure port 114 and low pressure port 115 are in fluid communication with first bore 118. Indicator aperture 116 is in fluid communication with second bore 120. First bore 118 extends from high pressure port 114 at high portion 123 to low pressure port 115 at low portion 122. Second bore 120 extends from indicator aperture 116 to second bore end 124. First bore 118 preferably has cylindrical walls defining a diameter of first bore 118. Likewise, second bore 120 preferably has cylindrical walls defining a diameter of second bore 120.

Device 110 includes components similar as to components of device 10 above. Particularly, magnetic piston 126, magnetic responder 134, indicator 138, and latching plate 140, are respectively similar to magnetic piston 26, magnetic responder 34, indicator 38, and latching plate 40 of the embodiment described above.

As shown in FIG. 4, device 110 further includes magnetic piston 126 having first piston end 127 and second piston end 128 having opposite polarities. Magnetic responder 134 has first responder end 135 and second responder end 136 having opposite polarities. In this embodiment, first piston end 127 and first responder end 135 face one direction respectively along bores 118 and 120, and second piston end 128 and second responder end 136 face the opposite direction respectively along bores 118 and 120. In this embodiment, first piston end 127 and second responder end 136 have same (North) polarities, and second piston end 128 and first responder end 135 have same (South) polarities.

As shown in FIG. 4, device 110 further includes spring 130 connected to magnetic piston 126 and low portion 122 to bias piston 126 toward high portion 123. Spring 130 determines the amount of pressure required to deflect piston 126.

In effect, as the differential pressure between pressure through high pressure port 114 and pressure through low pressure port 115 increases, magnetic piston 126 is moved toward low portion 122 against spring 130. As shown in FIG. 4, at zero pressure differential between ports 114 and 115, magnetic piston 126 is biased toward high portion 123 by spring 130. Also at zero pressure differential, magnetic responder 134 is seated against second bore end 124, as second piston end 128 magnetically repels magnetic responder 134 thereto.

Figure 5:
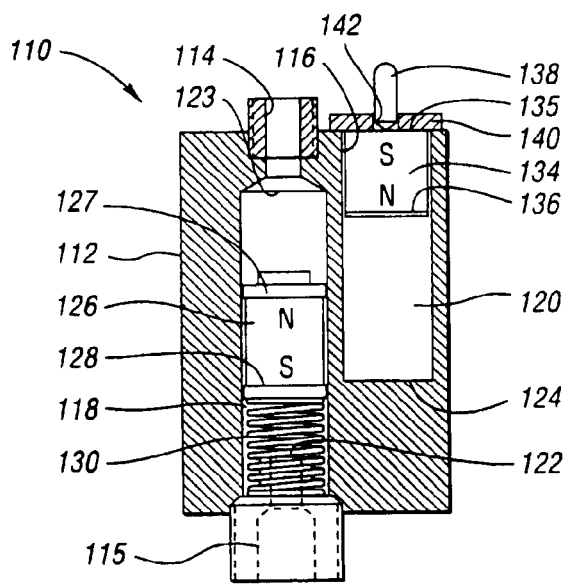
FIG. 5 is a side sectional view of the second embodiment at high differential pressure.

As shown in FIG. 5, as the pressure differential between ports 114 and 115 increases, the pressure moves magnetic piston 126 toward low portion 122, magnetically attracting first responder end 135 thus slightly moving responder 134 toward first piston end 127. At a predetermined differential pressure set by the resistance of spring 130, magnetic piston 126 moves towards low portion 122 a distance past second responder end 136 such that second responder end 136 is magnetically repelled from first piston end 127. As magnetic responder 134 is repelled therefrom, magnetic responder 134 moves toward indicator aperture 116 and latches onto latching plate 140 which is in magnetic relationship with first responder end 135. When latched the resulting magnetic affinity between latching plate 140 and magnetic responder 134 is greater than the magnetic affinity between magnetic piston 126 and magnetic responder 134. This may be accomplished in numerous ways, as stated above. As magnetic responder 134 latches onto latching plate 140, first responder end 135 engages indicator 138 and thrusts indicator 138 partially through hole 142 of latching plate 140. In effect, a threshold pressure differential is indicated to allow an operator of device 110 to act accordingly.

As stated for spring 30 of device 10, spring 130 of device 110 may be adjustable or replaceable to set the predetermined threshold pressure differential. Different springs or other biasing mechanisms used do not fall beyond the scope and spirit of this invention. Moreover, different pressure sensors, such as diaphragms or bellows, do not fall beyond the scope and spirit of this invention.

Figure 6:
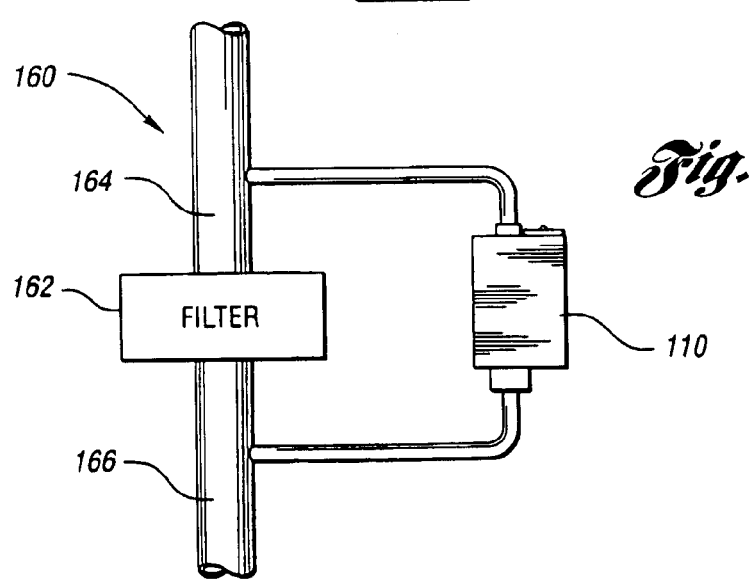
FIG. 6 is a schematic view of a system implementing the second embodiment shown in FIGS. 4 and 5.

In use, device 110, for example, may be applied to indicate maintenance needed to a filter within a high pressure line. FIG. 6 illustrates system 160 in which device 110 may be used. Device 110 may be used to indicate that filter 162 may need changing or cleaning. More specifically, high pressure port 114 may be connected to inlet line 164 upstream of filter 162 and low pressure port 115 may be connected to outlet line 166 downstream of filter 162. As filter 162 retains more and more debris, change in pressure between lines 164 and 166 will increase. As such, pressure through high pressure port 114 will be increasingly greater than pressure through low pressure port 115. At a predetermined threshold pressure differential between inlet and outlet sides, magnetic responder 134 will be repelled from magnetic piston 126 toward indicator aperture 116, latching onto latching plate 140 and thus thrusting indicator 138 partially outwardly. In effect, an operator of device 110 will be appropriately signaled that the filter may need changing or cleaning, thus at times saving the operator from performing troubleshooting procedures. Such application may be used for the embodiments described below.

Figure 7:
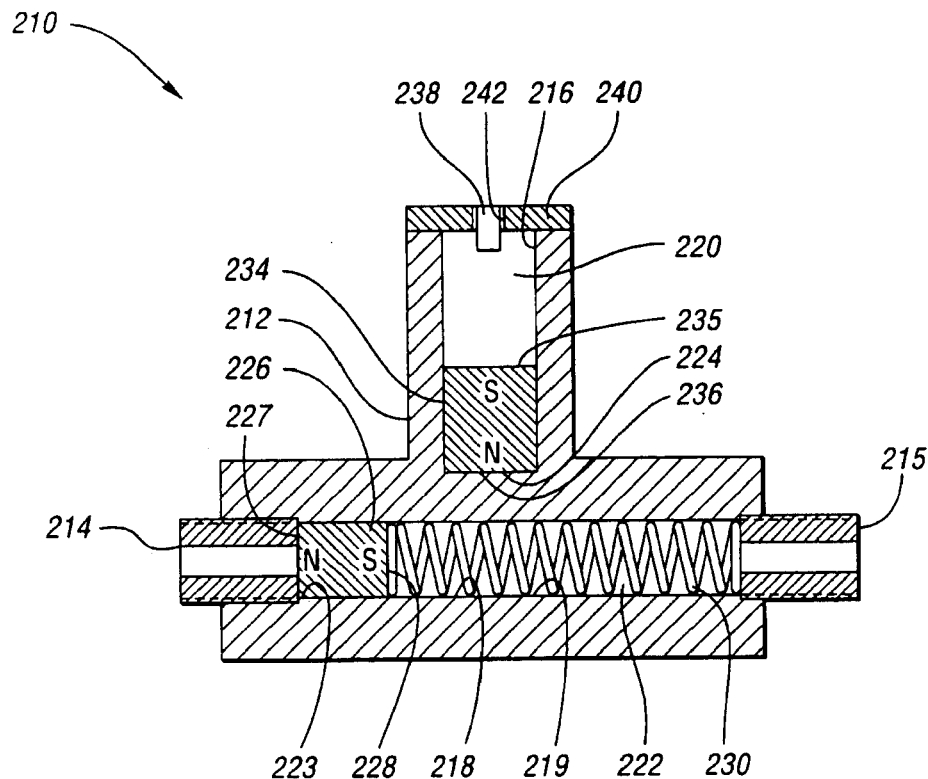
FIG. 7 is a side sectional view of a third embodiment of the device for indicating a threshold differential pressure.

It is to be noted that it is not essential that the first and second bores be substantially parallel. Other embodiments of the present invention may include bores being substantially perpendicular. For example, as shown in FIG. 7, device 210 includes first bore 218 which is substantially perpendicular to second bore 220. As shown, housing 212 includes high pressure port 214, low pressure port 215, and indicator aperture 216. High pressure port 214 and low pressure port 215 are in fluid communication with first bore 218. Indicator aperture 216 is in fluid communication with second bore 220. First bore 218 extends from high pressure port 214 at high portion 223 to low pressure port 215 at low portion 222. Second bore 220 extends from indicator aperture 216 to second bore end 224. First bore 218 may have inner walls 219 which define first bore 218. Second bore 220 may have cylindrical walls defining a diameter of second bore 220.

Device 210 may include components similar to components of device 110 above. Particularly, magnetic piston 226, magnetic responder 234, indicator 238, and latching plate 240, are respectively similar to magnetic piston 126, magnetic responder 134, indicator 138, and a latching plate 140 of the embodiment described above.

As shown in FIG. 7, device 210 includes magnetic piston 226 disposed across first bore 218 such that end 227 having a given (North) polarity and end 228 having an opposite (South) polarity are respectively disposed to face high pressure port 214 and low pressure port 215. As shown, both first piston end 227 of magnetic piston 226 and second responder end 236 of magnetic responder 234 have the same (North) polarities.

As shown in FIG. 7, device 210 further includes spring 230 connected to magnetic piston 226 and low portion 222 to bias piston 226 toward high portion 223. Spring 230 determines the amount of pressure required to deflect piston 226.

Figure 8:
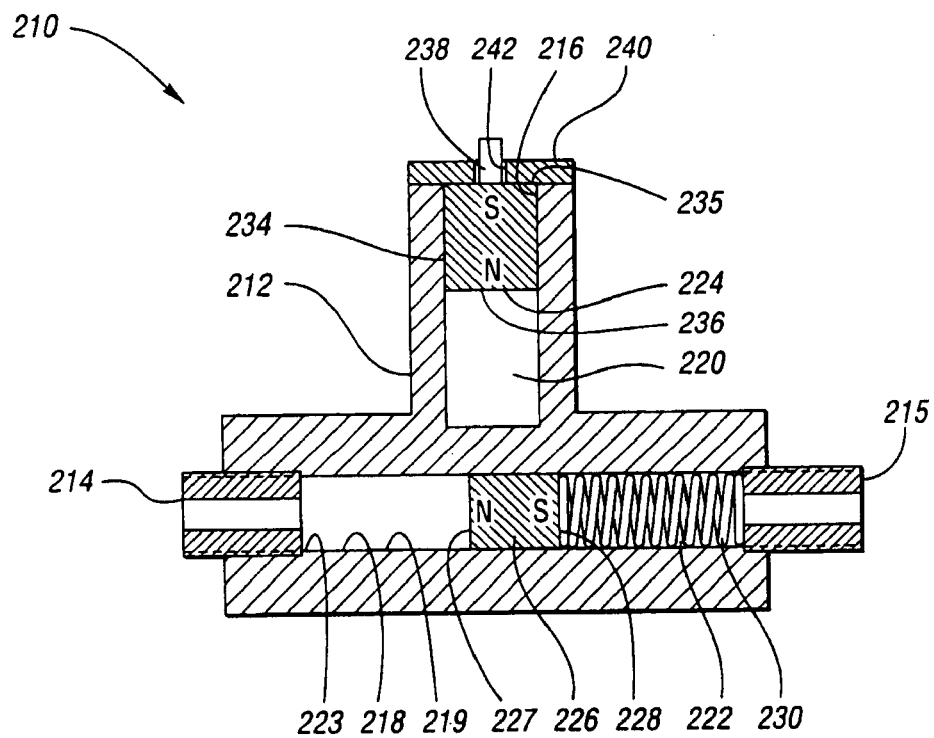
FIG. 8 is a side sectional view of the third embodiment at high pressure.

As shown, FIG. 7 indicates substantially zero or low differential pressure between pressure through high pressure port 214 and pressure through low pressure port 215. As differential pressure increases between ports 214 and 215, magnetic piston 226 moves along first bore 218 and against spring 230. As differential pressure increases, magnetic piston 226 moves toward magnetic responder 234. As shown in FIG. 8, a predetermined position along first bore 218, first piston end 227 of magnetic piston 226 repels second responder end 236 of magnetic responder 234 toward latching plate 240. At a predetermined pressure differential set by the resistance of spring 230, magnetic piston 226 moves toward low portion 222 a distance past second responder end 236 such that second responder end 236 is magnetically repelled from first piston end 227. As magnetic responder 234 is repelled therefrom, magnetic responder 234 moves toward indicator aperture 216 and latches onto latching plate 240 which is in magnetic relationship with first responder end 235.

As described in the embodiment above and illustrated in FIG. 8, as magnetic responder 234 latches onto latching plate 240, first responder end 235 engages indicator 238 and thrusts indicator 238 partially through hole 242 of latching plate 240. In effect, a threshold pressure differential is indicated to allow an operator of device 210 to act accordingly.

Figure 9:
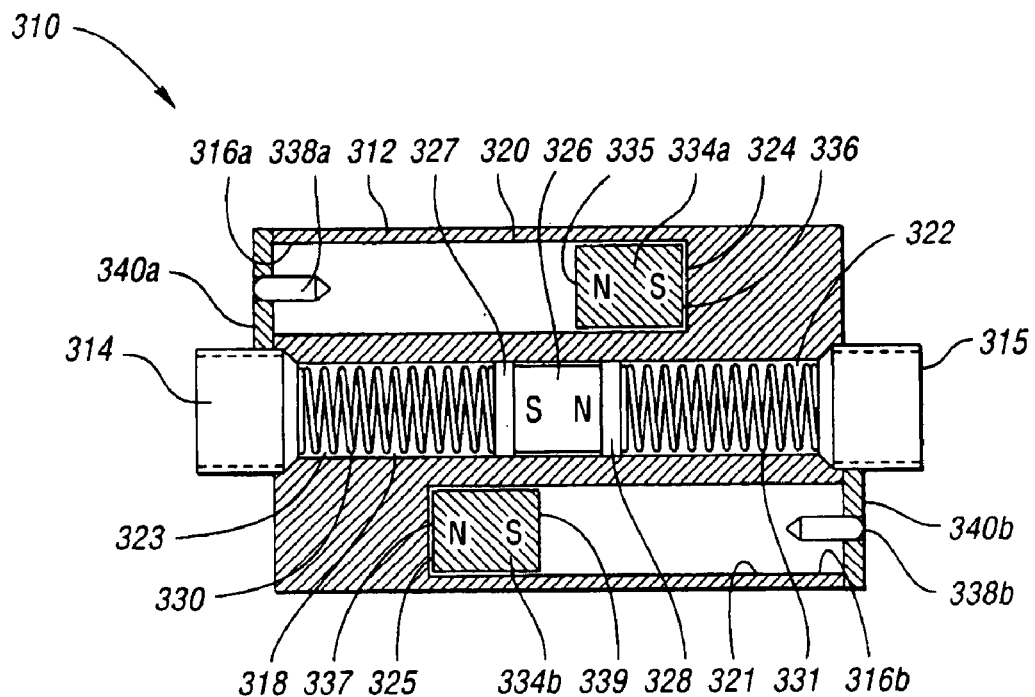
FIG. 9 is a side sectional view of a bi-directional device.

In yet another embodiment, the device may be a bi-directional device which includes greater than two bores in which magnets are disposed. As shown in FIG. 9, device 310 includes first bore 318 which is substantially parallel to second bore 320 and third bore 321. As shown, housing 312 includes pressure port 314, pressure port 315, and indicator apertures 316a, 316b. Pressure port 314 and pressure port 315 are in fluid communication with first bore 318. Indicator apertures 316a, 316b are in fluid communication with second bore 320 and third bore 321, respectively. The first bore 318 extends from pressure port 314 at portion 323 to pressure port 315 at portion 322. Second bore 320 extends from indicator aperture 316a to second bore end 324. Third bore 321 extends from indicator aperture 316b to third bore end 325.

As shown in FIG. 9, device 310 includes magnetic piston 326 disposed in first bore 318, and magnetic responders 334a and 334b disposed in second and third bores, respectively. In this embodiment, second end 336 of responder 334a and first end 327 of piston 326 have same polarities, and second end 337 of responder 334b and second end 328 of piston 326 have same polarities.

Device 310 may include components similar to components of device 110 above. Particularly, magnetic piston 326, magnetic responders 334a and 334b, indicator 338a and 338b, and latching plates 340a and 340b, are respectively similar to magnetic piston 126, magnetic responder 134, indicator 138, and latching plate 140 of the embodiment described above.

Figure 10:
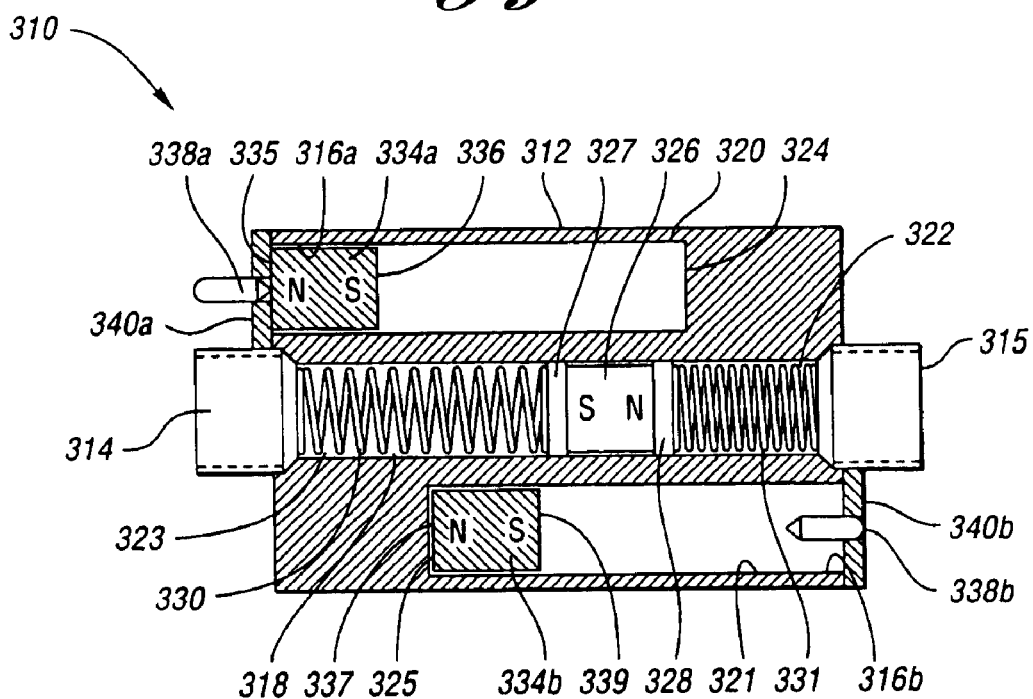
FIG. 10 is a side sectional view of the bi-directional device with the pressure at pressure port 314 greater than the pressure at pressure port 315.

As shown in FIG. 9, device 310 further includes springs 330, 331, respectively connected to ends 327, 328 of magnetic piston 326 to bias piston 326 in either direction along the first bore 318. Springs 330, 331 determine the amount of pressure required to deflect piston 326. FIG. 9 shows pressures in high port 314 and low port 315 substantially equal. FIG. 10 shows pressure in 314 greater than pressure in 315 deflecting piston 326 against spring 331 driving responder 334a to latch plate 340a thus indicating a threshold differential pressure has been reached. If pressure in 315 is greater than pressure in 314, piston 326 would deflect against spring 330 driving responder 334b to latch plate 340b thus indicating a threshold differential pressure has been reached.

As described above and shown in FIG. 10, magnetic responders 334a, 334b may be configured to repel from or attract to magnetic piston 326 in order to respectively latch on to latching plates 340a, 340b. Thus, either of indicators 338a, 338b may be thrusted partially through latching plates 340a, 340b, respectively to indicate to an operator of device 310 to act accordingly.

Other embodiments may include a device having first and second bores which are concentrically aligned. For example, the device may have a first bore concentrically within a second bore separated by a circular wall. A magnetic responder and a magnetic piston may be placed respectively within the first and second bores. The magnets may be configured as described in the embodiments described above. The magnetic piston may be ring shaped in order to be disposed within the second bore.

Other embodiments of the present invention may also include magnets of different shapes. For example, rather than piston shaped magnets, face magnetized magnets or rotary magnets may be implemented without falling beyond the scope or spirit of this invention. For example, a rotary magnet having a magnetized face may be used in lieu of a magnetic piston described above. The rotary magnet (not shown) may roll in accordance with pressure change toward a magnetic responder. At a predetermined pressure, the rotary magnet may repel the magnetic responder toward a latching plate as described above. In effect, the magnetic responder is repelled from the rotary magnet at a predetermined differential pressure toward the latching plate thus indicating that a threshold has been reached.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pressure fault device for indicating a threshold pressure, the device comprising:
    a housing having at least one inlet aperture and an indicator aperture and defining first and second bores in fluid communication respectively with the at least one inlet aperture and the indicator aperture;
    a magnetic piston disposed in the first bore, the magnetic piston being biasingly movable a predetermined distance away from the at least one inlet aperture in response to inlet threshold pressure;
    a magnetic responder disposed in the second bore and movable toward the indicator aperture in response to movement of the magnetic piston; and
    a latching plate in magnetically latching relationship to the magnetic responder when the magnetic piston moves the predetermined distance to indicate the threshold pressure has been reached.

2. The pressure fault device of claim 1 wherein the at least one inlet aperture includes two inlet apertures, the apertures being a high pressure port and a low pressure port at respectively each end of the magnetic piston.

3. The pressure fault device of claim 1 further comprising a biasing spring biasing magnetic piston in a direction toward the at least one inlet aperture.

4. The pressure fault device of claim 1 wherein the latching plate includes a hole formed therethrough and in alignment with the indicator aperture.

5. The pressure fault device of claim 1 further comprising an elongated indicator suspended through the indicator aperture, whereby the magnetic responder latches to the latching plate and thrusts indicator partially through indicator aperture.

6. The pressure fault device of claim 1 wherein the magnetic piston has first and second piston ends respectively facing opposing directions along the first bore, the piston ends having opposite magnetic polarity.

7. The pressure fault device of claim 6 wherein the magnetic responder has first and second responder ends respectively facing opposing directions along the second bore, the responder ends having opposite magnetic polarity, the first responder end having opposite magnetic polarity to the magnetic polarity of the first piston end.

8. The pressure fault device of claim 1 further comprising a seal disposed about the magnetic piston.

9. A pressure fault device for indicating an inlet threshold pressure, the device comprising:
    a housing including an inlet aperture and an indicator aperture formed therethrough, the housing having a first bore in fluid communication with the inlet aperture, the first bore extending from the inlet aperture to a shoulder, the housing having a second bore in fluid communication with the indicator aperture, the second bore extending from the indicator aperture to a second end and being formed adjacent the first bore;
    a magnetic piston disposed in the first bore, the magnet piston being biased toward the inlet aperture and movable from the inlet aperture in response to inlet threshold pressure a predetermined distance;
    a magnetic responder disposed in the second bore and movable toward the indicator aperture in response to movement of the magnetic piston;
    an indicator partially disposed in the second bore of the housing and partially through the indicator aperture; and
    a latching plate disposed on the housing, the latching plate having a hole formed therethrough and aligned with the indicator aperture, the magnetic follower being in magnetically latching relationship with the latching plate when the piston moves the predetermined distance along the first bore, thrusting the indicator outwardly partially through the indicator aperture.

10. The pressure fault device of claim 9 further comprising a spring disposed at the shoulder of the first bore and biasingly connected to the magnetic piston, allowing inlet pressure to work against the piston.

11. The pressure fault device of claim 9 wherein the first and second bores are substantially parallel to each other.

12. The pressure fault device of claim 9 further comprising a seal disposed about the magnetic piston.

13. A pressure fault device for indicating a threshold differential pressure, the device comprising:
    a housing including a high pressure port, a low pressure port, and an indicator aperture formed therethrough, the housing defining first and second bores, the first bore having high and low portions respectively in fluid communication with the high and low pressure ports, the second bore being in fluid communication with the indicator aperture and extending to a second bore end;
    a magnetic piston disposed in the first bore and between the ports, the magnetic piston having first and second piston ends respectively facing the high and low pressure ports, the first and second piston ends having opposite magnetic polarities, the magnetic piston being biased toward the high pressure port in response to substantially zero pressure differential between the ports, the magnetic piston being oppositely movable a predetermined distance toward the low pressure port in response to pressure differential between the ports;
    a magnetic responder disposed in the second bore adjacent the second end, the magnetic responder having first and second responder ends respectively facing the indicator aperture and the second bore end, the first responder end having opposite magnetic polarity to first piston end, the second responder end having opposite magnetic polarity to the second piston end, the magnetic responder being movable toward the indicator aperture in response to movement of the magnetic piston; and
    a latching plate in magnetically latching relationship to the magnetic responder when the magnetic piston moves the predetermined distance in response to differential pressure between the ports.

14. The pressure fault device of claim 13 further comprising a spring disposed at the low portion of the first bore and biasingly connected to the magnetic piston, allowing the differential pressure to work against the piston.

15. The pressure fault device of claim 13 further comprising a spring disposed at the high portion of the first bore and biasingly connected to the magnetic piston, allowing the differential pressure to work against the piston.

16. The pressure fault device of claim 13 further comprising a third bore and a second indicator aperture, the third bore being in fluid communication with the second indicator aperture and extending to a third bore end.

17. The pressure fault device of claim 16 further comprising:
- a second magnetic responder disposed in the third bore, the second magnetic responder having first and second indicator ends respectively facing the second indicator aperture and the third bore end, the first indicator end of the second magnetic responder having the same magnetic polarity to the first piston end, the second indicator end of the second magnetic responder having the same magnetic polarity to the second piston end, the second magnetic responder being movable toward the second indicator aperture in response to movement of the magnetic piston; and
- a latching member in magnetically latching relationship to the second magnetic responder when the magnetic piston moves the predetermined distance in response to differential pressure between the ports.

18. The pressure fault device of claim 17 wherein the magnetic piston is biased between the high pressure port and low pressure port in response to substantially zero differential pressure between the ports, the magenetic piston being movable a predetermined distance at a respectively opposite direction in response to differential pressure between the ports.

* * * * *